Sept. 5, 1961         L. L. BAUR ET AL         2,998,891
                  SIDE LOADING FORK LIFT TRUCK
Filed Dec. 17, 1956                         12 Sheets-Sheet 1

INVENTORS
ARNE V. LARSON, HARVEY P. GARDAFEE
DONALD A. KUESTER, LESLIE L. BAUR,
ROBERT M. PUTZER, ROYAL C. LEEMAN
BY Wheeler, Wheeler & Wheeler
ATTORNEYS Sept. 5, 1961     L. L. BAUR ET AL     2,998,891
SIDE LOADING FORK LIFT TRUCK Filed Dec. 17, 1956     12 Sheets-Sheet 3

INVENTORS
ARNE V. LARSON, HARVEY P. GARDAFEE
DONALD A. KUESTER, LESLIE L. BAUR,
ROBERT M. PUTZER, ROYAL C. LEEMAN
BY Wheeler, Wheeler & Wheeler
ATTORNEYS

INVENTORS
ARNE V. LARSON, HARVEY P. GARDAFEE
DONALD A. KUESTER, LESLIE L. BAUR,
ROBERT M. PUTZER, ROYAL C. LEEMAN

BY Wheeler, Wheeler & Wheeler
ATTORNEYS

Sept. 5, 1961     L. L. BAUR ET AL     2,998,891
SIDE LOADING FORK LIFT TRUCK
Filed Dec. 17, 1956     12 Sheets-Sheet 7

Fig. 21     Fig. 22

INVENTORS
ARNE V. LARSON, HARVEY P. GARDAFEE,
DONALD A. KUESTER, LESLIE L. BAUR,
ROBERT M. PUTZER, ROYAL C. LEEMAN

By Wheeler, Wheeler & Wheeler
ATTORNEYS

Fig. 27

INVENTORS
ARNE V. LARSON, HARVEY P. GARDAFEE,
DONALD A. KUESTER, LESLIE L. BAUR
ROBERT M. PUTZER, ROYAL C. LEEMAN
BY Wheeler, Wheeler + Wheeler
ATTORNEYS

Fig. 34

United States Patent Office 2,998,891
Patented Sept. 5, 1961

2,998,891
SIDE LOADING FORK LIFT TRUCK
Leslie L. Baur, Harvey P. Gardafee, Donald A. Kuester, Arne V. Larson, and Robert M. Putzer, Clintonville, and Royal C. Leeman, Shiocton, Wis., assignors to FWD Corporation, a corporation of Wisconsin
Filed Dec. 17, 1956, Ser. No. 628,583
4 Claims. (Cl. 214—621)

This invention relates to a side loading fork lift truck.

The objects of the invention are to produce a fork lift truck which can handle an exceptional variety of loads with extreme flexibility of movement, to produce a vehicle which is very compact, to provide unusually simple controls for the operator to produce the various movements of which the lift towers are capable and to provide accessories for use with the truck which greatly enhance its usefulness.

More specifically, it is an object to provide a truck having lift towers which are capable not only of lifting, but also of tilting. The towers are movable bodily for the entire width of the truck, and are further capable of performing these movements either simultaneously or independently. Another object is to provide a portable platform for use in connection with the lift truck which may be locked to the forks of the lift towers in such a manner as to permit the lift towers to perform their various movements either concurrently or independently without damage to the portable platform or to its load. It is a further object to provide a portable platform on which the load may be moved longitudinally and rotated on its axis while it is retained securely upon the portable platform in order to further enhance the flexibility and usefulness of the combination.

A further object of the invention is to provide a utility truck upon which the portable platform may be placed for ease of attachment to the forks of the fork lift truck and which is provided with novel wheel brakes which may be readily engaged and disengaged while the utility truck is in close proximity to the side of the fork lift truck, and which is further provided with means for interlocking the platform with the utility truck to prevent its accidental removal therefrom.

A further object of the invention is to provide a lift tower having exceptional range of lifting movement and which is exceptionally well adapted to withstand the various unusual strains to which it is subjected by reason of the range and relative directions of movement of which the towers themselves and the portable platform are capable. In an alternative feature of the invention, an objective is to provide a similar lift tower in which novel rollers are provided between the various parts which simplify the construction and drastically reduce the required number of rollers.

A further object of the invention is to provide a novel means for mounting the fork lift towers for bodily movement transversely of the lift truck which provides exceptional stability of the lift towers against the strains imposed by the various movements of which the lift tower and the portable platform are capable.

A further object of the invention is to provide a support for a portion of the vehicle transmission which distributes the weight and the torque reaction imposed upon it in a novel manner leading to great economies in space and material and which enables easier, faster and more accurate assembly of the transmission parts in correct alignment.

A further object of the invention is to provide a novel mounting for a removable windshield on the driver's compartment of the vehicle which permits secure mounting of the windshield but which also permits instant removal thereof.

A further object is to provide a fabric covering for the upper portion of the driver's compartment which has a novel mode of attachment to the rest of the compartment and which has a novel attachment to the door of the compartment.

In the drawings:

FIG. 13 is a cross-sectional view on line 13—13 of FIG. 9 showing part of the means by which rotational movement is imparted to the load on the portable platform.

The fork lift truck consists of a chassis 30 in which are mounted an engine 31 and the usual accessories, the engine being so mounted that its crankshaft is transverse to the direction of travel of the truck. It is provided with a conventional clutch 32 and transmission 33. The output shaft of the transmission is connected to a two speed right angle transfer case 34 which contains planetary and differential gearing for driving two output shafts 35 which extend in opposite directions longitudinally of the truck. Universal joints 36 and propeller shafts 37 connect output shaft 35 with conventional differentials 38 in the axles of the vehicle. Front wheels 39 are steerable by means of conventional linkages shown in FIG. 27.

Figures 25, 26, 28:
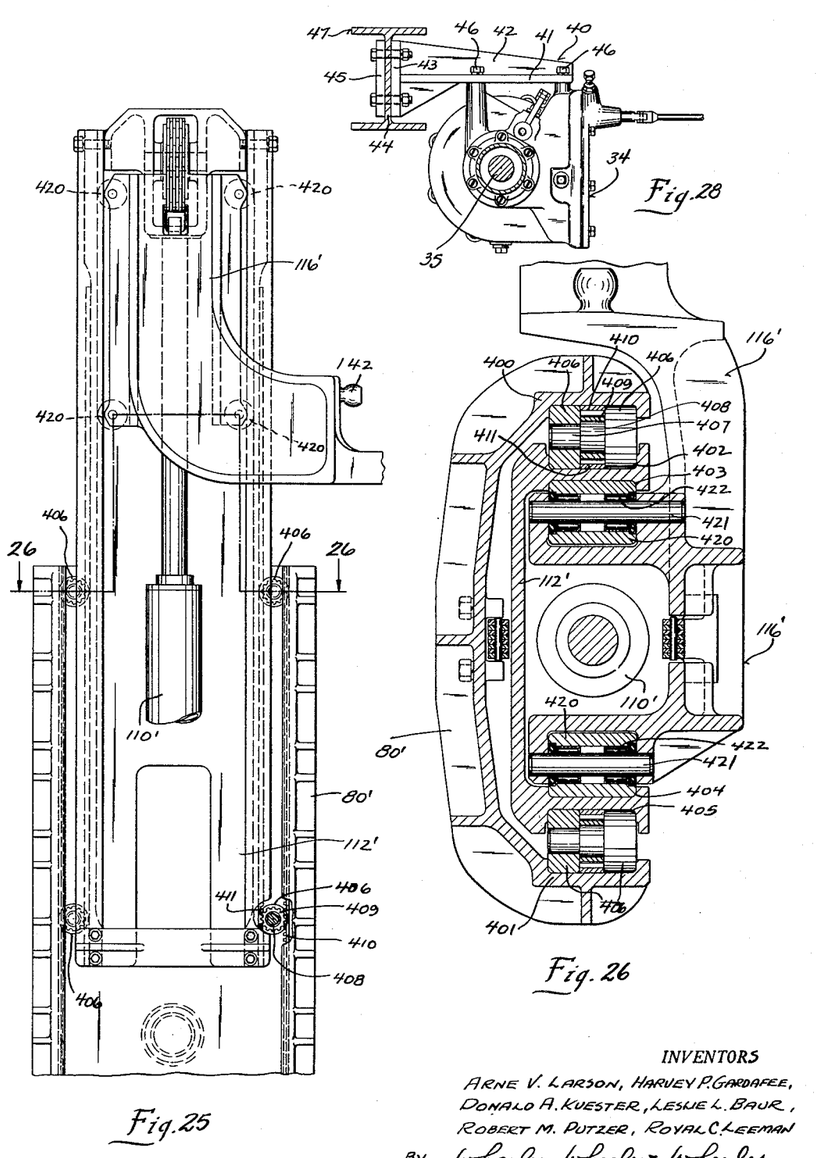
FIG. 25 is an end elevation of a modified form of lift tower with portions broken away to show the rollers.
FIG. 26 is a cross-sectional view on line 26—26 of FIG. 25 showing the modified rollers.
FIG. 28 is a side view of the right angle transfer case and its mounting bracket.
Figure 27:
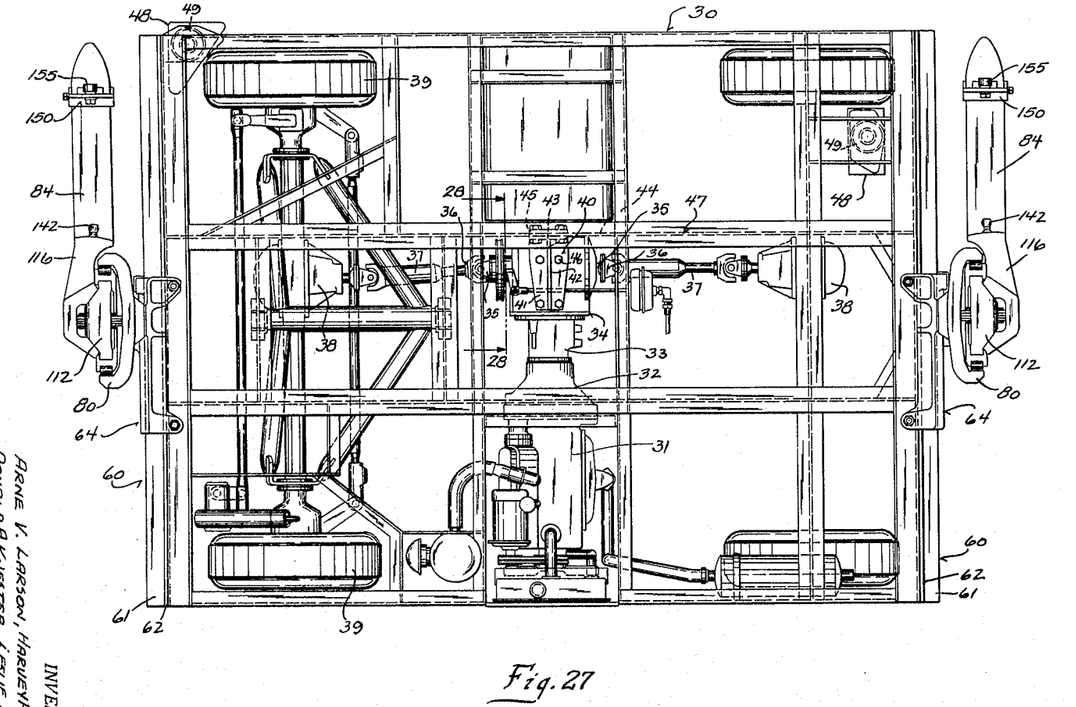
FIG. 27 is a top plan view of the truck with the driver's compartment and deck plates removed, showing only the chassis, the driving parts, the towers and the outriggers.

Right angle transfer case 34 is supported by a unique cantilever bracket 40 having a horizontal web 41, a vertical web 42 and a second vertical web 43 at right angles to web 42 at the end of the bracket. Web 43 is bolted to the vertical web 44 of an I-beam which is part of chassis 30 and which extends the length of the vehicle. It may be backed up by a plate 45 on the other side of the I-beam from web 43, through which the bolts also pass. Transfer case 34 is suspended from this bracket by means of bolts 46 which extend through horizontal web 41 into the housing of transfer case 34. This results in a cantilever construction whereby both the weight of the transfer case and associated power transmission elements, and the torque reaction of the transmission assembly tend to rotate bracket 40 about chassis member 47 to which it is attached. Thus chassis member 47 in effect becomes a torsion bar of great rigidity, which rigidity is increased by the attachment to it of various transverse chassis members, as shown in FIG. 27. It should also be observed that the bolts 46 which support transfer case 34 take all of the strain which is imposed upon them in tension and compression rather than in shear, which increases their effective strength and lessens the number of supporting bolts required as compared to the conventional method of bolting the ends of such a transfer case to chassis members. This method of mounting also makes it relatively simple to use shims at the various bolts in order to align the various transmission elements as compared with prior art methods.

Outriggers 48 are provided at each end of the right side of the vehicle to stabilize it when the lift towers are being used. These consist of telescopic hydraulic cylinders 49 having a ball 50 at the end of the piston rod 51 and a socket 52 in which the ball 50 is universally movable. A sole plate 53 is attached to socket 52. The connections for operating the outriggers 48 will be described in connection with the hydraulic system as a whole.

At the ends of the vehicle, transverse tracks 60 are provided which extend the full width of the vehicle. These tracks consist of a horizontal web 61 and vertical webs 62 and 64. The top deck 63 of the vehicle does not extend to vertical web 62 so that a channel is left between the track and the deck of the vehicle. A carriage 64 is adapted to ride on the track by means of rollers 65, 66, 67 and 68 (see FIGS. 6 and 8). As there indicated, rollers 65 bear on the inner face of vertical web 62 in the channel formed by the shortened deck plate 63. Rollers 66 roll on the top surface of web 61 while roller 67 bears on its bottom surface. Rollers 68 bear on the outer surface of the lower extension of web 62. As indicated in FIG. 6, rollers 65, 66 and 68 are provided at each side of tower carriages 64 but only one roller 67 is provided on each carriage because virtually all the forces that are applied to the tower tend to pull the top of the tower outwardly rather than inwardly, the tower being supported only on its inward side.

Figure 6:
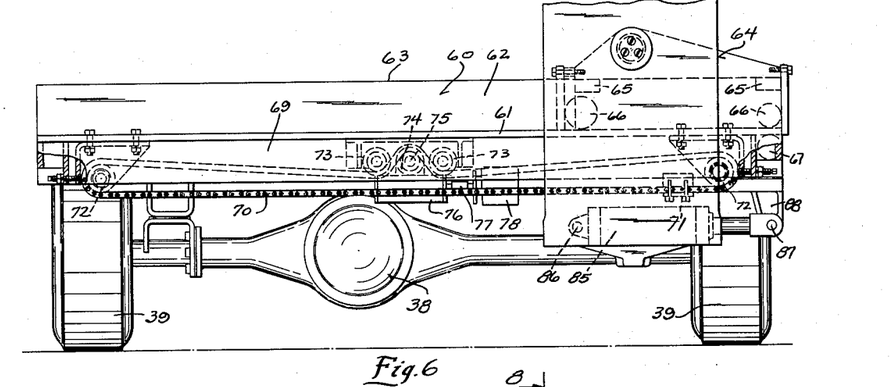
FIG. 6 is an end view of the truck with various details of the tower and of the outriggers omitted to show the means for moving the lift towers transversely of the truck and the means for pivoting the lift towers.
Figure 7:
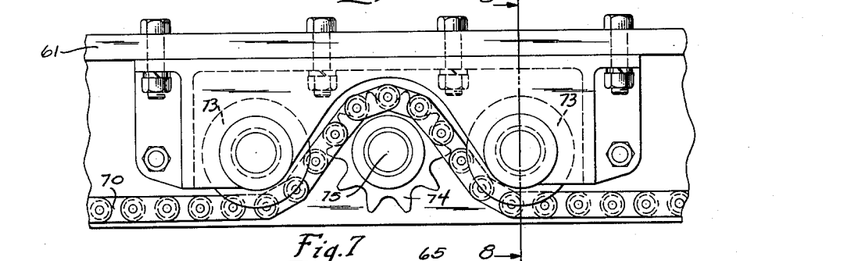
FIG. 7 is an enlarged view showing the driving means for the chain.
Figure 8:
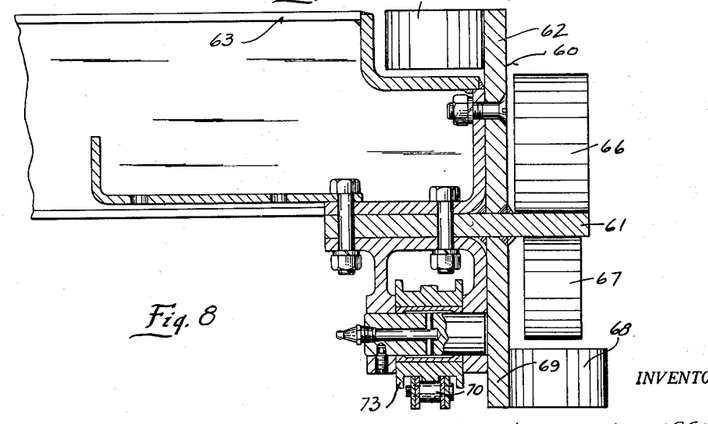
FIG. 8 is a cross-sectional view on line 8—8 of FIG. 7.

The tower is made to move along track 60 by means of the mechanism shown in FIGS. 6, 7 and 8. A drive chain 70 is bolted at 71 to the tower carriage 64. The chain runs over idlers 72 which are so spaced laterally as to permit the carriage to move the full width of the vehicle. The upper run of chain 70 passes under idlers 73 and over drive sprocket 74. Sprocket 74 is attached to the output shaft 75 of a conventional right angle gear drive 76 (FIG. 6) which is in turn coupled at 77 by conventional means to a rotary reversible hydraulic motor 78. Thus, when motor 78 is driven, it causes chain 70 to pull carriage 64 along track 60. The hydraulic connections to the motors 78 at each end of the vehicle will be discussed in connection with the hydraulic system as a whole.

Figures 3, 4, 5:
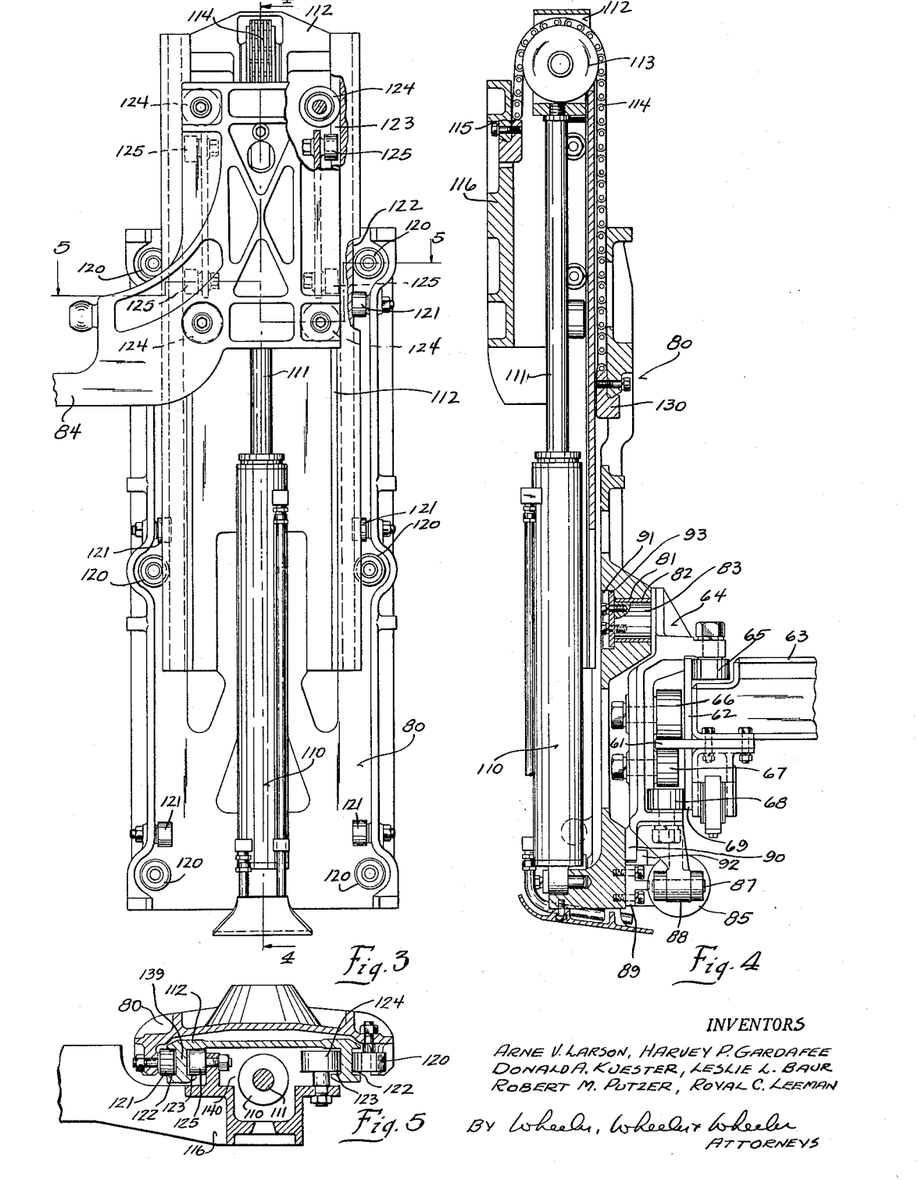
FIG. 3 is an end elevation of the front lift tower of the truck.
FIG. 4 is a cross-sectional view on line 4—4 of FIG. 3.
FIG. 5 is a cross-sectional view on line 5—5 of FIG. 3.

Each lift tower 80 is provided with a large horizontal bore 81 having a wear-resisting bushing at 82 to receive pivot pin 83. Pivot pin 83 is integral with tower carriage 64 and extends longitudinally of the truck. A counterbore 91 in tower member 80 permits a retainer plate to be bolted to pin 83 to hold the tower to the carriage. Thus, tower 80 may be pivoted in a plane transverse of the truck to vary the angle of fork 84 with the horizontal. Pivotal movement is effected by a hydraulic cylinder 85 whose body is pivotally attached at 86 to the lower portion of the lift tower 80 and whose piston rod is pivotally attached at 87 to a projection 88 extending downwardly from tower carriage 64. Additional stability for lift tower 80 in a plane longitudinal of the truck is provided by a projection 89 on the bottom of lift tower 80 which has an upward projection 92 that embraces the edge of an arcuate plate 90 which forms the lowermost portion of tower carriage 64. Tower 80 is further provided with a hydraulic cylinder 110 having a piston rod 111 which carries an intermediate member 112. Intermediate member 112 carries a sheave 113 over which runs a chain 114 or other flexible member. The chain is attached at 115 to the inner side of lift fork casting 116 of which fork tine 84 is an integral part. Rollers 120 are secured by any appropriate means to lift tower 80 to rotate in a plane transverse to the truck, while rollers 121 are similarly secured to tower member 80 in a plane at right angles to rollers 120. Both the rollers 120 and the rollers 121 engage a channel 122 in intermediate member 112. Rollers 120 engage the bottom of channel 122 and rollers 121 engage the sides of the channel 122 so that member 112 must follow a linear path when cylinder 110 is actuated. As shown in FIGS. 3 and 5, member 112 is provided with channels 123 back to back with channels 122. The fork casting 116 is provided with rollers 124 which bear on the bottom of channel 123 and with rollers 125 which bear on the sides of channel 123. Rollers 124 and 125 are rotatably secured to fork casting 116 in any suitable manner. Thus, the fork casting 116 is constrained to follow a linear path with respect to intermediate member 112.

Chain 114 is fastened at one end to block 115 which is bolted to fork casting 116 and is fastened at the other end to block 130 which is bolted to lift tower 80 (see FIG. 4). Thus, when intermediate member 112 is raised by hydraulic cylinder 110, fork member 116 moves at twice the speed of the intermediate member. The parts are so arranged and proportioned that when intermediate member 112 is at its lowest point, fork tine 84 is on the ground. However, because fork casting 116 moves upwardly at twice the speed of intermediate member 112 the fork casting arrives at the top of intermediate member 112 prior to the time when the lower edge of intermediate member 112 passes the pair of rollers 120 which are intermediate the height of lift tower 80, so that adequate support is assured at all times.

Figures 1, 2:
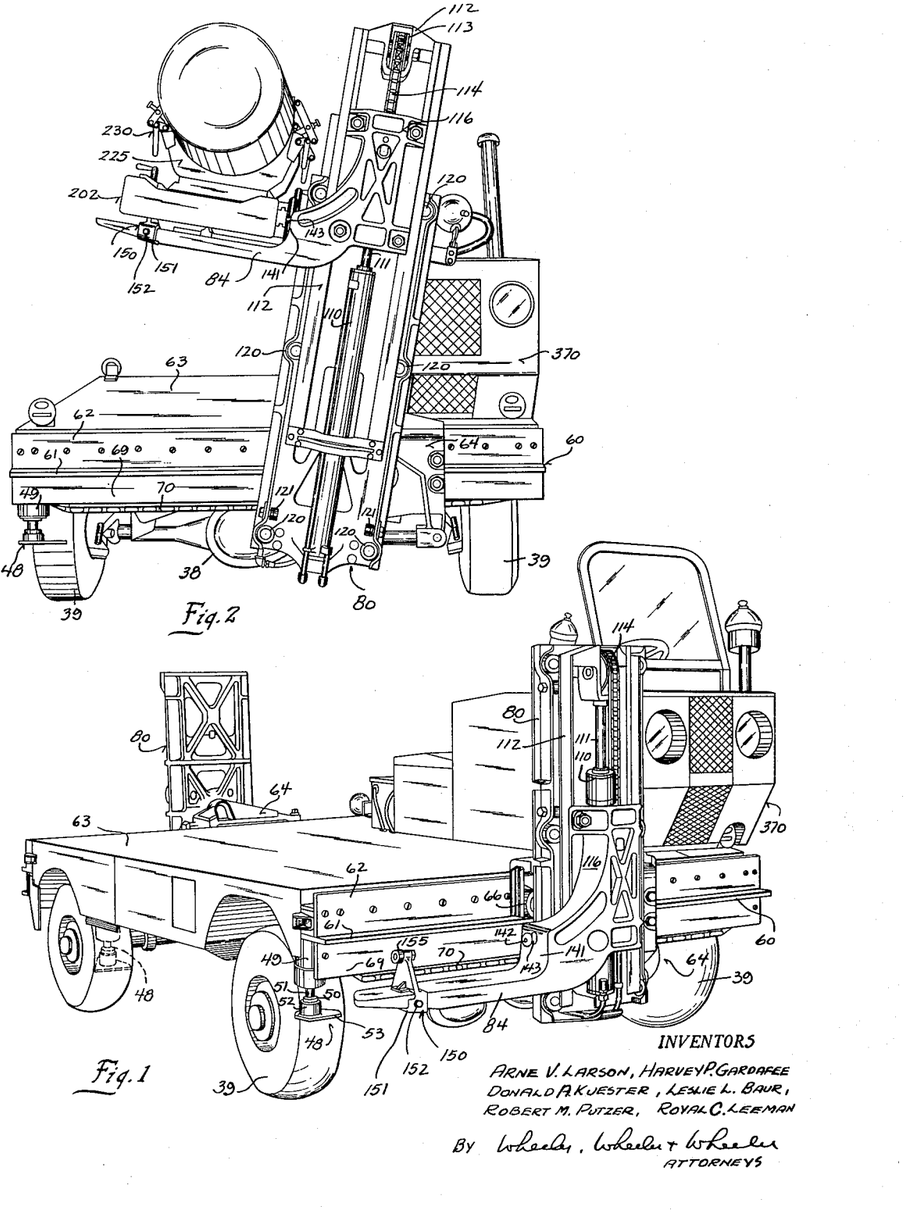
FIG. 1 is a perspective view from the right front corner of the truck.
FIG. 2 is a front perspective view of the truck showing the portable platform secured to the lift forks and showing a cylindrical load secured to the portable platform.

As shown in FIGS. 3 and 5, the lift tower 80 is channel-shaped in cross section. Member 112 which nests inside member 80 is also channel-shaped with the open side of member 112 facing the same direction as the open side of member 80. Member 116 is also channel-shaped in its main body portion and nests in member 112, but has the open side of the channel opposed to the open side of the channel of member 112. Inasmuch as the sides 140 of member 116 are between the sides 139 of member 112, an open space is created in the center of the lift tower for cylinder 110 (see FIGS. 1 and 5).

Figure 17:
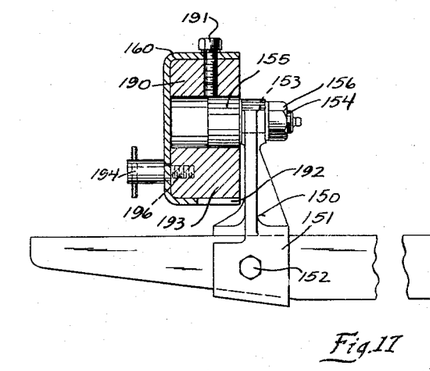
FIG. 17 is a cross-sectional view on line 17—17 of FIG. 9 showing the manner in which the forks are secured to the platform.
Figures 18, 19:
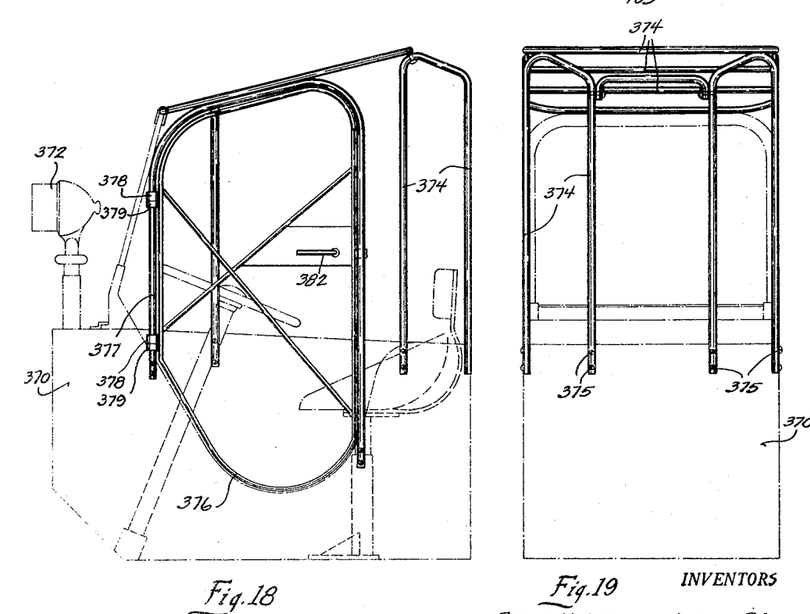
FIG. 18 is a side view of the driver's compartment of the truck.
FIG. 19 is a rear view of the driver's compartment.
Figure 20:
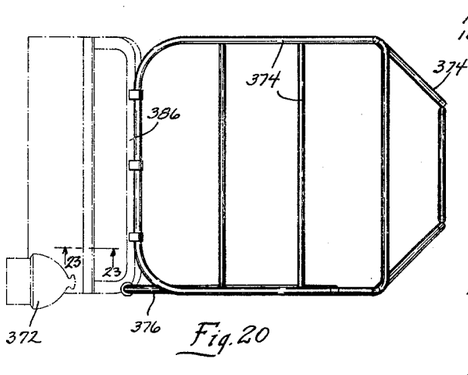
FIG. 20 is a top view of the driver's compartment.
Figures 21, 22:
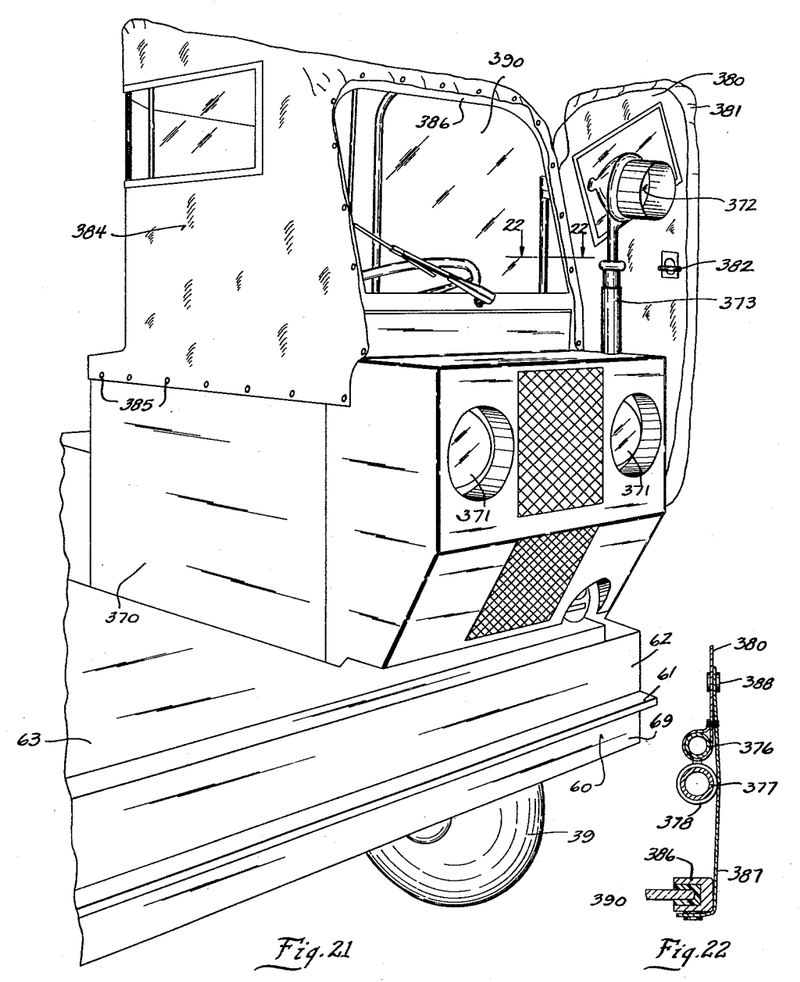
FIG. 21 is a right front view of the driver's compartment.
FIG. 22 is a cross-sectional view on line 22—22 of FIG. 21 showing the releasable interconnection between the fabric of the driver's compartment and the fabric of the door of the compartment.

The lower portion of member 116 is extended transversely of the truck to form fork tine 84. A vertical shoulder 141 is provided at the base of tine 84, in the upper portion of which a ball 142 is secured by a neck 143. Neck 143 is secured to fork casting 116 by any appropriate means such as a nut 144 on threaded stub 145 which is integral with neck 143 (see FIG. 17). At the outer end of fork 84 is a stand 150 having a lower portion 151 which embraces fork 84 and is secured thereto by any appropriate means such as bolt 152. At the upper end of stand 150 is a bore 153 for the pivot pin 154 of roller 155. Pin 154 is secured from axial movement in bore 155 by suitable means such as nut 156. The stand 150 is of such a height that the axis of roller 155 is aligned with the axis of ball 142.

An alternate form of construction of the lift towers is shown in FIGS. 25 and 26. This lift tower is basically similar to that already described, being provided with a main tower portion 80′ which is roughly channel-shaped in cross section and which is provided with opposed inwardly facing channels 400 and 401. Likewise there is an intermediate channel-shaped member 112′ having opposed channels 402 and 403 on one side member of the channel and opposed channels 404 and 405 on the other side of the channel. A similar fork member 116′ is provided which is substantially channel-shaped in cross section with the channel opening oppositely to the channel member 112′ so as to enclose a lift cylinder 110′. However, the rollers 406 between members 80′ and 112′ are pressed onto axis pins 407 having an enlarged central portion 408 upon which is journaled a pinion 409. Pinion 409 engages racks 410 and 411 in the bottoms of channels 400 and 402. The pinions 409 are kept from binding on rollers 406 by the shoulders defining the enlarged central portion 408 of the center pin. The roller assemblies are designed to be a snug fit in channels 400 and 402 both axially and radially, so that a single roller assembly is effective to do the work of two radially loaded rollers 120, 121 at right angles to each other as shown in FIGS. 3, 4 and 5. Moreover, because of the pinions 409 and racks 410 the roller assemblies are not fixed with respect to either member 80′ or member 112′ but move up and down between them at half the rate at which member 112′ is moved.

A different form of axially loaded roller is used between members 112′ and 116′. Rollers 420 revolve on pins 421 which are fixed in bores in member 116′. They may, if desired, be provided with bearings 422 between pins 421 and rollers 420. The rollers 420 are a snug fit both radially and axially in channels 403 and 404, thereby transmitting both longitudinal and transverse forces between members 112′ and 116′. It will be observed that whether rollers such as rollers 406 or rollers such as rollers 420 are used, or a combination of the two as in the described tower, far fewer rollers are required than with conventional designs in which the rollers are loaded only radially and not axially.

Figures 9, 10, 11, 12, 15:
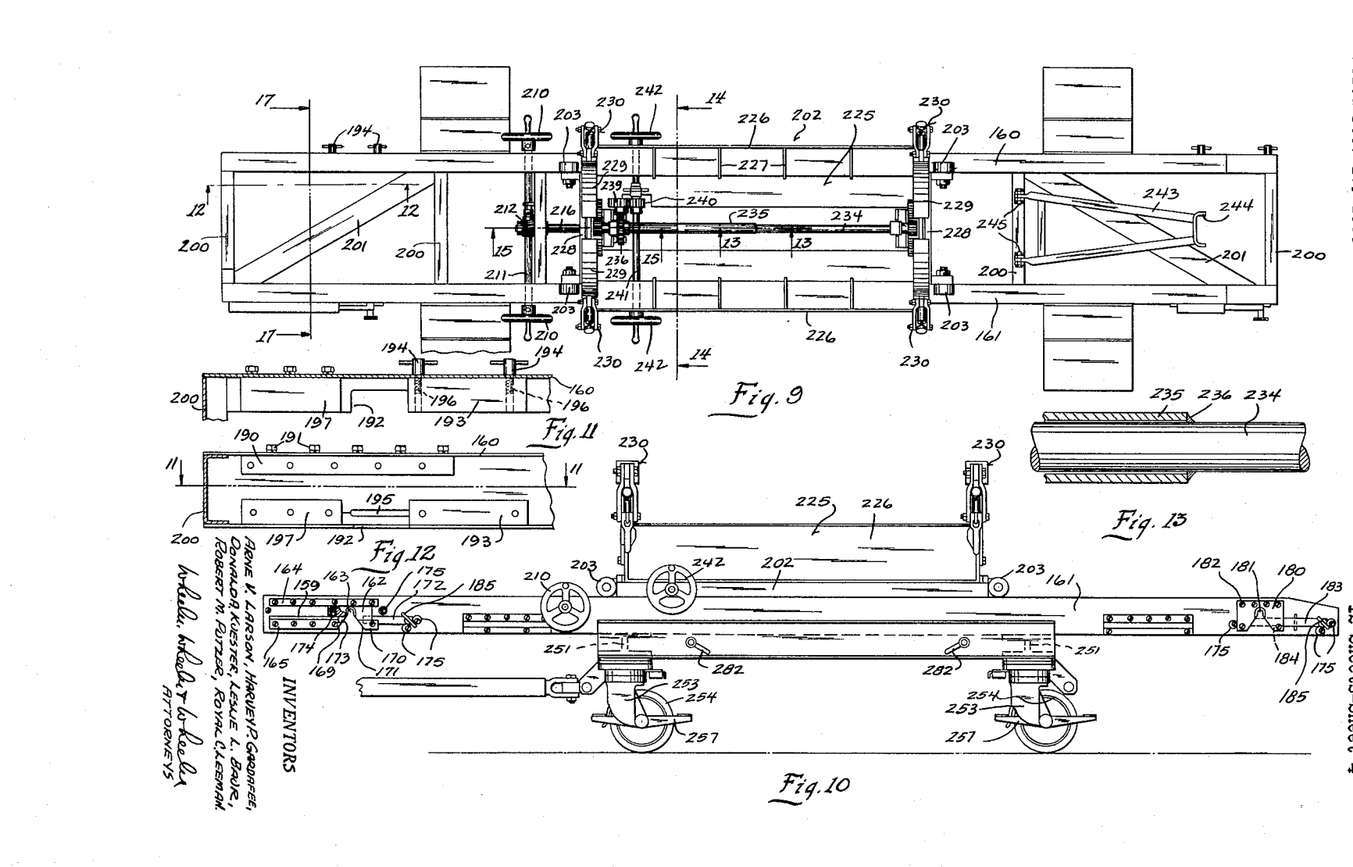
FIG. 9 is a top plan view of the portable platform.
FIG. 10 is a side view of the portable platform.
FIG. 11 is a cross-sectional view on line 11—11 of FIG. 12.
FIG. 12 is a cross-sectional view on line 12—12 of FIG. 9.
FIG. 15 is a cross-sectional view on line 12—12 of FIG. 8.

A portable platform is provided for use with forks 84 having frame members 160 and 161 which run longitudinally of the lift truck in use. At one end of frame member 161 a member 162 is provided having a socket 163 for ball 142. Member 162 is supported by members 164 and 165, which members are respectively provided with channels 166 and 167. A tongue 168 integral with member 162 rides in channel 166. Socket 163 in member 162 is open downwardly to the lower surface of member 162 so that ball 142 may be inserted in the socket from below. Supporting rail 165 ends at 169 in a taper which is designed to help direct ball 142 into the socket 163. A complementary member 170 ends in a similar taper 171. Thus, when member 162 is in the proper position on rails 169 and 170 the ball 142 may be inserted into socket 163. Locking bar 172 is adapted to fill mating grooves 173 and 167 in rail 165 and socket member 162 and to become a continuation of tongue 159 and may be withdrawn as shown in FIG. 10 to permit insertion of ball 142 in socket 163. After insertion of the ball into the socket, bolt 172 is inserted beneath ball 142 and into groove 173 in rail member 165 thereby locking ball 142 in socket 163. The arrangement of the parts just described permits socket member 162 to slide longitudinally of the portable platform along rail members 165, 164 and 170 while positively retaining ball 142 in socket 163. A spring-pressed ball 174 is provided in a bore in socket member 162 in order to assist in properly aligning socket member 162 with surfaces 169 and 171 for insertion and removal of ball 142, a dimple being provided in tongue 159 of member 165 for engagement by the ball when correct alignment is secured. The force applied to the ball 174 is insufficient to prevent easy movement of member 162. Eccentric disks 175 are screwed to frame member 161 above and below bolt 172 and at the ends of its intended path of movement to guide the bolt and prevent binding. Being eccentric, these disks are adjustable by rotation to the precise position required.

At the other end of member 161 a fixed socket member 180 is provided which has a socket 181 similar to socket 163 for the reception of ball 142 on the other fork 84 of the lift truck. However, member 180 is secured directly to member 160 by means of bolts 182. A locking bolt 183 slides in a channel 184 in member 180 so that it may be inserted beneath ball 142 and withdrawn. Eccentric disks 175 are provided below bolt 183 and at the ends of its path of movement. On both bolts 172 and 183 a conventional spring pressed latch member 185 is provided which, when the bolt is fully inserted beneath ball 142 enters a hole, not shown, in member 161. Upon withdrawal of member 185 against the pressure of the spring, not shown, it may be used as a handle for moving locking bolts 172 and 183.

Member 160 similar to member 161 forms the other longitudinal frame member of the portable platform. This member is channel-shaped like member 161 with the channel opening inwardly. At each end of the channel, a bar 190 is secured to the top web of the channel by any appropriate means such as bolts 191. The lower surface of this bar provides a surface upon which roller 155, which is mounted on fork tine 84 as previously described, bears to support the portable platform. The section 192 of the lower web of the channel 160 is cut away sufficiently to provide an opening through which roller 155 may be inserted vertically into the channel at the same time that balls 142 are entering sockets 163 and 181. After the roller has entered the channel and is against the lower surface of bar 190, locking bar 193 may be slid under roller 155 by means of handles 194 in order to close the opening 192 and secure the roller 155 against withdrawal. Thus it cooperates with fixed bar 197 to firmly anchor roller 155 to member 160 vertically but permitting free horizontal movement of the roller along bar 190. Handles 194 operate in slot 195, and are integral with bolts 196, so that turning the handle is effective to lock and unlock bar 193 from frame member 160. This structure is identical on both ends of frame member 160 to accommodate rollers 155 on both forks 84 of the lift truck, and bar 190 is of such proportions as to insure the alignment of the axes of rollers 155 with the axes of balls 142 so that the portable platform is supported in a plane parallel to the plane of forks 84.

In operation, socket member 180 and its associated ball 142 provides the only point on the portable platform which is fixed with respect to either of the lift forks. Each of the other connections is free for movement in the plane of the frame of the portable platform, socket member 162 by sliding between upper rail 164 and mounting bar 172 and lower rails 169 and 170, and rollers 155 by rolling along bars 190. Thus, if one of the lift towers is moved transversely of the truck while the other remains stationary, the distance between balls 142 will increase and socket member 162 will slide along its ways to compensate, while rollers 155 will likewise roll along their ways so that the supporting points for the portable platform assume the positions of the corners of a non-rectangular parallelogram. Similarly, if one lift fork is raised while the other remains stationary, the distance will increase between balls 142 and between rollers 155, and the plane in which the portable platform is supported will be tilted. However, the lift towers themselves may not be tilted independently about pins 83 while the portable platform is locked to the forks in the manner described, since that would result in the supporting points for the portable platform not being in the same plane, and would have the effect of warping the frame of the portable platform.

The remainder of the main frame of the portable platform is composed of cross members 200 and diagonal braces 201. A large space in the center of the main frame is left without cross members to accommodate sub-frame 202, which is a rectangular framework designed to fit snugly between side rails 160 and 161 as clearly shown in FIG. 11. Rollers 203 are fastened by appropriate brackets to sub-frame 202 to ride longitudinally along the top of members 160 and 161, while rollers 204 are appropriately secured to sub-frame 202 to bear on the under side of the top web of main frame members 160 and 161. The bars 190 upon which rollers 155 bear do not extend sufficiently far toward the center of the main frame of the portable platform to interfere with the longitudinal movement of rollers 204 between cross members 200.

Longitudinal movement of the sub-frame within the main frame is achieved by means of hand wheels 210 which are appropriately secured to shaft 211 which is journaled in bores in the main frame members 160 and 161. At the center of shaft 211, a worm 212 is secured to shaft 211 by appropriate means such as the key 213 to rotate therewith. The worm gear 214 is secured by means of key 215 to shaft 216 which extends at right angles to shaft 211. Shaft 216 is secured by shoulders 217 and collar 218 against axial movement in the bore 219 in cross member 200. A threaded portion 220 of shaft 216 engages a nut 221 which is rigidly secured to sub-frame 202, as shown in FIG. 15. A rotatable cradle 225 is mounted on sub-frame 202 composed of side members 226 braced by ribs 227 and end members 228. The cradle is desirably also provided with pads 229. These are shown arcuate, so as to support a cylindrical load, but may be of any desired shape according to the load which is to be carried, or may be interchangeable to support various shapes of loads. The cradle is also desirably provided with some means of securing the load to it such as toggle clamps 230, inasmuch as the load may be tilted at various angles during handling.

Figure 14:
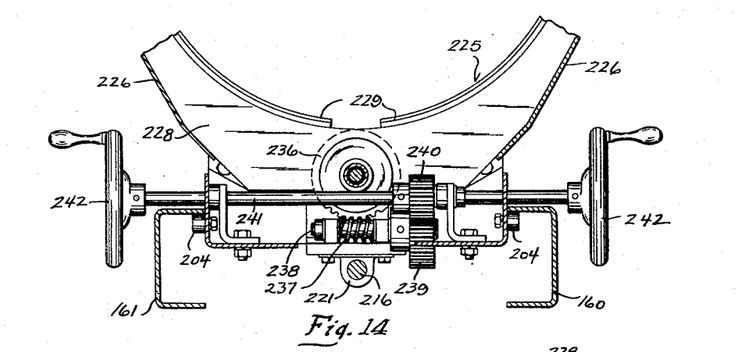
FIG. 14 is a cross-sectional view of the portable platform on line 14—14 of FIG. 9.
Figures 15, 16:
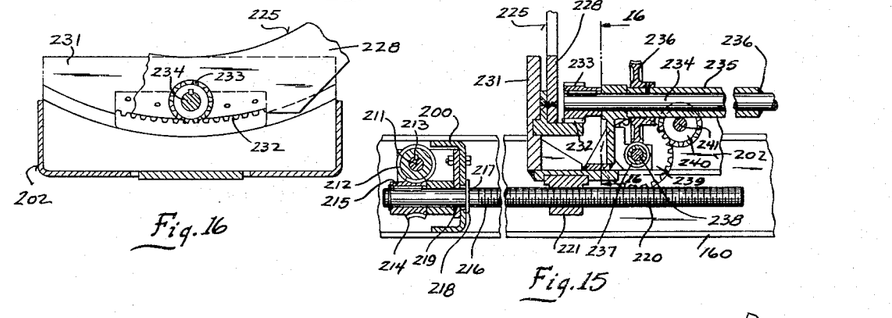
FIG. 16 is a cross-sectional view on line 16—16 of FIG. 15.

The cradle 225 is supported on the sub-frame 202 by means of an arcuate tongue and groove connection between a vertical part 231 of sub-frame 202 and the gear sector 232 which is rigidly secured to end plate 228 of cradle 225. A pinion 233 is provided at each end of shaft 234 to engage gear sector 232. Shaft 234 is in turn driven by shaft 235 which comprises a hollow tube joined at 236 to the center of shaft 234 by any appropriate means, as shown in FIGS. 13 and 15. By this arrangement, torque is applied equally to both pinions 233, whereas if the torque were applied to shaft 234 at one end, the great length of the shaft would permit it to twist, warping cradle 225 unless an unduly large diameter shaft were used. Shaft 235 is driven by worm gear 236 (see FIGS. 14 and 15). Worm 237 at right angles to worm gear 236 is fixed to stud shaft 238. At the other end of stud shaft 238 is pinion 239 which is driven by pinion 240 on shaft 241. Shaft 241 bears two hand wheels 242 on either side of the sub-frame, shaft 241 being sufficiently long so that hand wheels 242 clear the main frame members 160 and 161. If only one hand wheel is desired, shaft 241 may be tangent to worm gear 236 and may turn worm 237 directly.

In some applications, it may be desired to brace the load temporarily on the cradle against expected forces and for this purpose a brace 243 with ends 244 for bracing against a protruding portion of the load may be provided at any point on the main frame such as cross member 200 and may be pivoted as at 245 in order to lie flat on the main frame when not in use. In operation, the brace 243 may be raised against the load just back of a protruding portion and then the sub-frame 202 may be moved longitudinally by means of hand wheels 210, the load being prevented from longitudinal movement on cradle 225 by means such as toggle clamps 230 when the ends 244 engage the load.

A utility truck is also provided upon which to place the portable platform for engagement and disengagement from forks 84. The utility truck has frame members 250 between which the side members 160 and 161 of the portable platform rest on cross members 251. The platform is supported on caster wheels 252 (see FIGS. 30 through 33).

These caster wheels have a conventional fork 253 between the arms of which a conventional wheel 254 is rotatably mounted on axle pin 255, nuts 256 securing the axle to fork 253. A foot lever 257 is pivotally mounted on the same axle 255 between the wheel and the housing. Its ends are bent axially at 258 and radially again at 259 to form a support for foot pads 260. A bolt 261 having a nut 262 secures spacer 263 non-rotatably between the ends of foot levers 257. A cam lever 264 having a cam surface 265 extends between spacer 263 and wheel 254. Cam surface 265 is so formed as to deviate very slightly upwardly and outwardly from a circle concentric with axle 255 about which lever 257 is pivoted. A block 266 is secured by bolts 267 or other appropriate means to housing 253 and is bored to take a pin 268 upon which lever 264 is fixed by pin 269 at its upper end. Portions 270 also extend above pin 268 and are bored at 269 to receive compression springs 271. Block 266 is also bored at 272 to receive the other end of springs 271, so that brake shoe lever 273 is constantly urged away from wheel 254. Clevis portions 270 of brake shoe lever 273 are pivoted on pin 268 straddling lever 264.

Figures 30, 31, 32, 33:
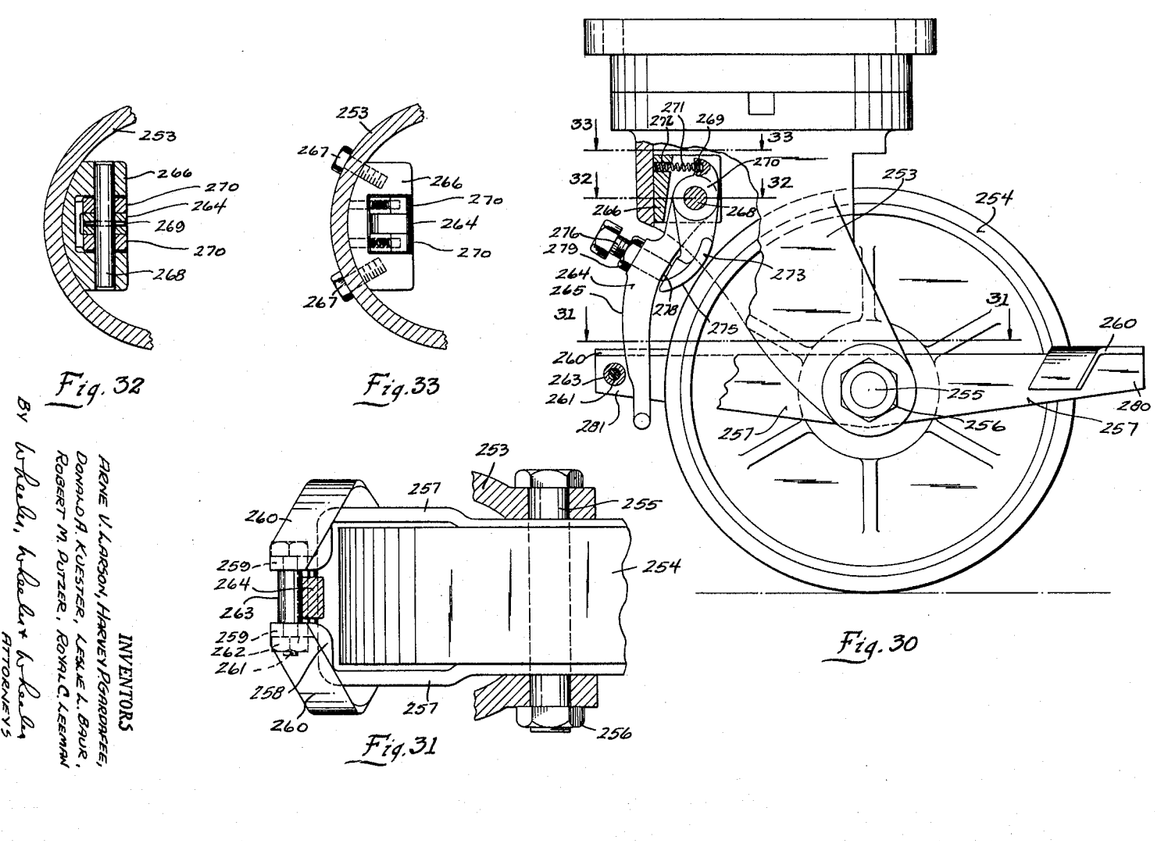
FIG. 30 is a side view of the caster wheel of the utility truck.
FIG. 31 is a cross-sectional view on line 31—31 of FIG. 30.
FIG. 32 is a cross-sectional view on line 32—32 of FIG. 30.
FIG. 33 is a cross-sectional view on line 33—33 of FIG. 30.

Brake pad 275 is adapted to bear against wheel 254 when pressure is applied to it. Screw 276 is threaded into cam lever 264 with its lower end protruding at 278 to bear on brake shoe 273. Jam nut 279 locks screw 276 into position after it has been adjusted to bring lever 264 to correct operating position. When spacer 263 is at the lower end of cam lever 264, brake shoe 273 is forced away from wheel 254 by spring 271. Because cam surface 265 on lever 264 deviates only slightly from a circle concentric with axle 255, when end 280 of foot lever 257 is pressed to move spacer 263 upwardly on cam surface 265, the friction between the parts locks the spacer to the cam lever until end 281 of foot lever 257 is pressed to release the brake.

It will be noted that in addition to its efficiency the braking arrangement described may be added to almost any caster wheel or other wheel having an axle mounted on a fork.

The hydraulic system of the vehicle is actuated by a pump 290 (see FIG. 29) which is driven in a conventional manner from the engine of the vehicle. From pump 290, lines 291 and 292 carry the oil to valve bodies 293 and 294, each of which contains five double-acting spool valves 300 through 309. Each spool valve is capable of reversing a double-acting cylinder or of letting oil bypass from the lines 291 and 292 to lines 310 or 311 which lead back to sump 312, sump 312 being in turn connected to the intake side of pump 290. Each valve is operated by conventional control levers not shown.

Figure 29:
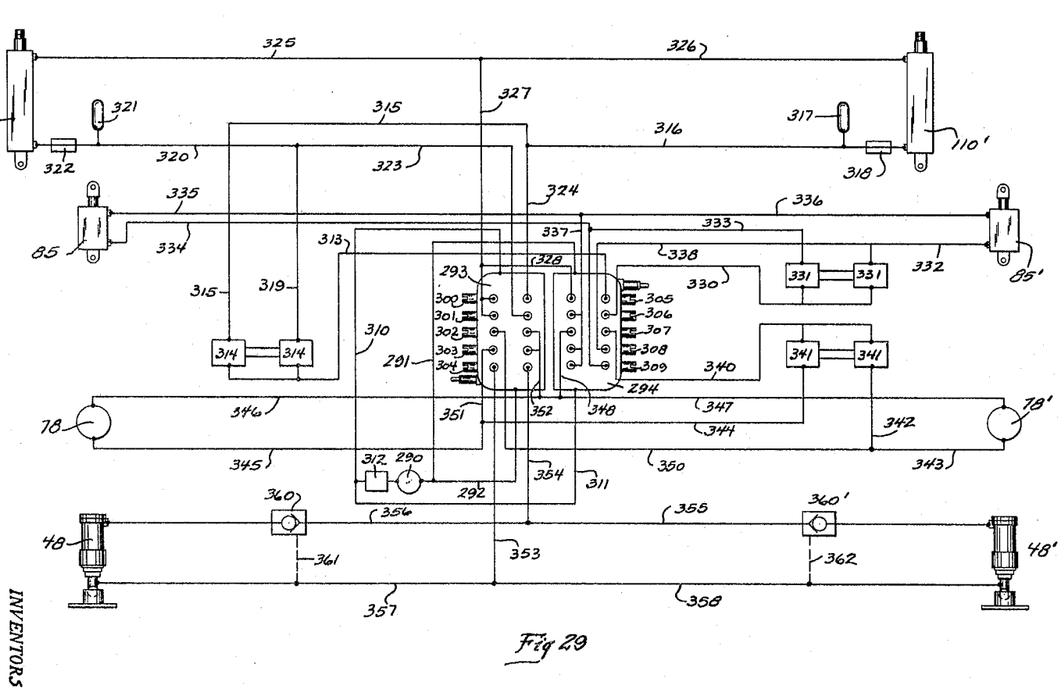
FIG. 29 is a schematic diagram of the hydraulic system of the truck.

Front and rear lift cylinders 110 and 110' are both actuated by valve stem 305. The oil travels through line 313 to hydraulic flow dividers 314 comprising a pair of hydraulic motors which are mechanically coupled together to deliver the same volume of oil to each output circuit. One output circuit goes through lines 315, 316 to hydraulic accumulator 317 and flow regulator 318 and thence to cylinder 110', while the other output circuit goes through lines 319, 320 to hydraulic accumulator 321 and pressure regulator 322 and thence to hydraulic lift cylinder 110. Oil cannot flow in branch lines 323 and 324 since valves 300 and 301 are in their neutral position. Return oil flows through lines 325 and 326 to line 327 and back to the valve by branch line 328. The flow may be reversed by actuating valve stem 305 in the other direction. In this manner, both cylinders 110, 110' are actuated simultaneously. However, each cylinder may be actuated individually by the use of valves 300 and 301. If valve 300 is actuated, the oil flows up line 324 and line 316 to cylinder 110'. Oil cannot flow in line 315 because line 313 leads to a closed valve. Return oil flows through lines 326 and 327 back to valve 300. In a similar manner, valve 301 sends oil through lines 323 and 320 to cylinder 110 from which return oil flows through line 325 and 327 back to the valve, any alternative path being closed by other valves which are not actuated.

In a similar manner, valve 306 is effective to operate both tilting cylinders 85 and 85' through line 330 to flow equalizers 331, thence through lines 332, 333 and 334, the return oil passing through lines 335, 336 and 337 back to valve 306. Valves 308 and 309 operate cylinders 85' and 85, independently, through lines 338 and 334, respectively, the return oil following the same path as that described in the case of valve 306. Valve 307 is effective to operate motors 78, 78' which cause the lift towers to move transversely of the truck, through lines 340, hydraulic flow dividers 341, and output lines 342, 343 and 344, 345, while return oil flows in lines 346, 347 and 348 back to the valve. Valves 302 and 303, respectively, operate motors 78' and 78 independently through lines 350, 343 and lines 351, 345 respectively, the return oil moving through lines 346 and 347 to line 352. The outriggers are simultaneously operated from valve 304 by means of lines 353, 354, 355, 356, 357 and 358. No atempt is made to insure coordinated movement of the outriggers 48 and 48', inasmuch as it is immaterial whether they are at the same level as long as they bear equally against the ground. In fact, there is a positive advantage in not having them coordinated, since in this way they are able to compensate for uneven ground. Pilot operated ball check valves 360 and 360' are provided in lines 356 and 355 to maintain the outriggers in their extended position without the continued application of pump pressure. These valves have a line 361 branching from return line 357 to the check valve to operate a small piston (not shown) that unseats the ball to allow oil to pass through, whereby the application of pressure to line 357 by reversing valve 304 will unseat the check valve and permit the outrigger to be retracted. A branch line 362 from line 358 performs the same function for outrigger 48'.

It will be seen from an examination of the hydraulic diagram and from the above description that each of the lift tower movements may be carried out either concurrently with the other lift tower by the use of a single actuating valve or may be operated independently by the use of other actuating valves.

The cab of the vehicle will now be described (see FIGS. 18 through 24). The lower portion of the cab 370 is formed of sheet metal and is relatively permanently attached to the vehicle. It is provided with headlights 371 recessed into the cab structure for safety and with spotlights 372 mounted on telescopic posts 373 within which an electric cord, not shown, is coiled so as to be extensible with the telescopic post 373. The upper cab is formed of tubular members 374 which are fastened with bolts 375 to the sheet metal lower body 370. A door frame 376 is formed of rods and hinged to the upper cab member 377 by means of collars 378 which are welded to the door frame 376 and collars 379 which are welded to upper cab member 377. A canvas covering 380 is sewed to the door frame 376 in such a manner that a flap 381 protrudes stiffly in the plane of the door frame to seal the edges of the door opening when the door is closed. The door is kept closed by a conventional latch 382. Tubular upper cab members 374 are also covered with fabric 384 which has numerous snaps 385 securing its entire margin to the lower cab body and to the windshield frame 386. This material is extended at 387 to snap onto the fabric of the door at 388, thus effectively sealing the door hinge against drafts.

Figure 23:
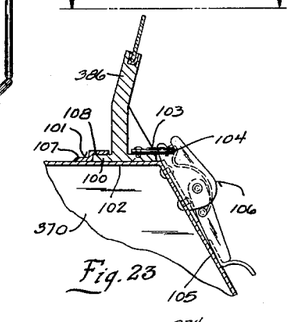
FIG. 23 is a cross-sectional view on line 23—23 of FIG. 20 showing the means by which the windshield is attached to the driver's compartment.
Figure 24:
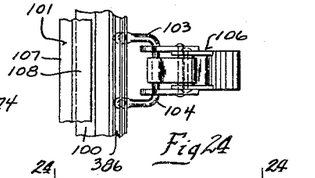
FIG. 24 is a view on line 24—24 of FIG. 23 with the glass removed from the windshield.

The windshield 390 is set in a special frame 386 to be quickly demountable and yet be securely attached during use. The frame 386 has a horizontally extending lower portion 100 which extends forwardly along the horizontal upper portion 102 of lower cab body 370 and which is secured under bracket 101. Bracket 101 has a portion 107 rigidly attached to the lower cab body and a portion 108 beneath which flange 100 is a snug fit. Lower portion 100 of frame 386 also projects to the rear of the windshield where brackets 103 are secured thereto having portions 104 extending transversely of the truck and overhanging the dashboard 105. Conventional toggle clips 106 are secured to dashboard 105 at appropriate points to apply firm downward pressure to portions 104 of brackets 103, thereby clamping windshield frame 386 to lower cab body 370.

Figure 34:
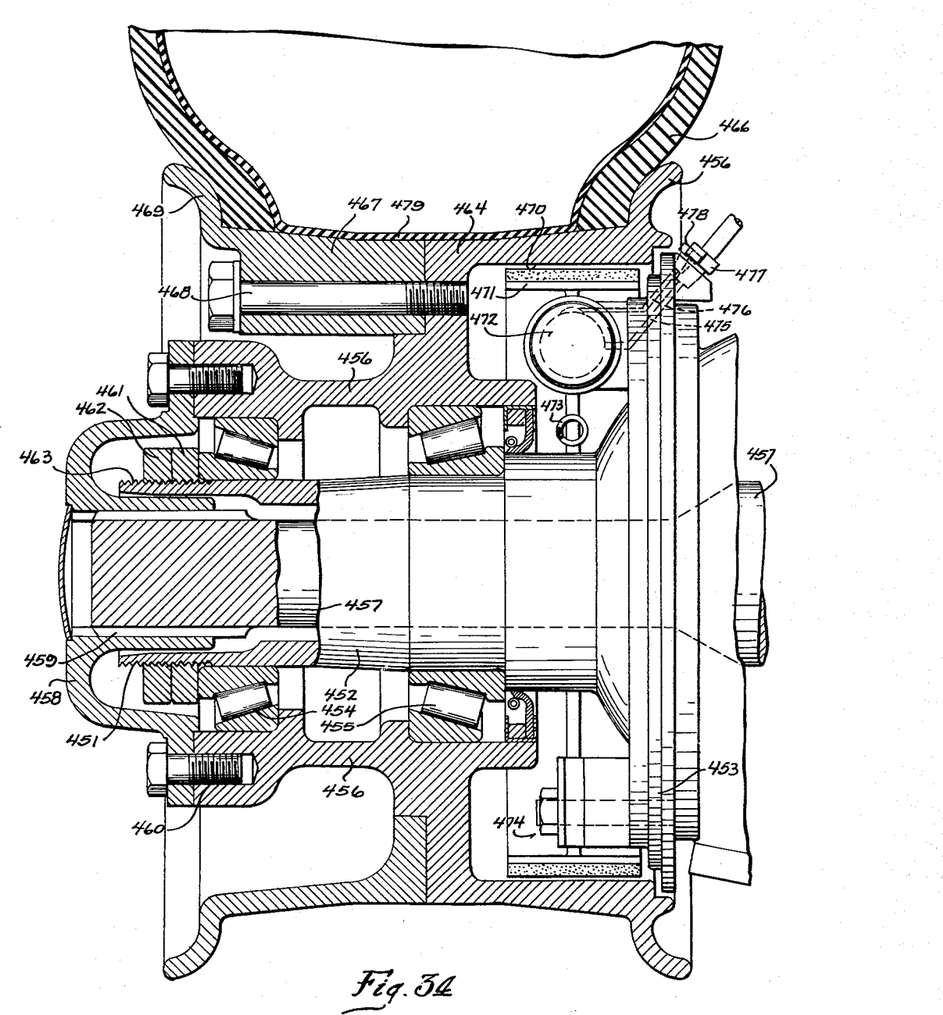
FIG. 34 is a cross-sectional view of one of the front wheels of the truck.

The wheels of the truck are mounted on skeins 451 and are composed of tubular portions 452 and annular portions 453. Tapered roller bearings 454 and 455 support wheel hub 456 on the tubular portion 452 of the skein. A drive shaft 457 rotates within the skein and a drive member 458 is splined to the drive shaft at 459 and bolted to the wheel hub 456 at 460. Nuts 461 and 462 are screwed to a threaded portion 463 on the end of the skein to secure the bearings and the wheel against axial movement. Wheel rim 464 is integral with hub 456 and is provided with a side flange 465 which retains tire 466 on the rim. Demountable portion of the rim 467 is secured by means of bolts 468 to rim portion 464 which is integral with hub 456, rim portion 467 being provided with a side flange 469 to retain the other bead of tire 466. Rim portion 464 has an inner surface 470 which serves as a brake drum, and which underlies tire 466. Brake shoe 471 can be forced against brake drum 470 by means of a conventional brake actuating cylinder 472 and is retracted by a conventional spring 473. Brake shoe 471 has a peripheral extent sufficient to underlie nearly one half of the brake drum 470, a similar shoe not shown underlying the other half of drum 470. These shoes are pivoted at 474 to a stud mounted on annular portion 453 of the skein. Cylinder 472 is provided with fluid under pressure through passage 475 which is drilled in the skein itself, rather than directly through flexible tubing. Likewise passage 476 which is utilized for bleeding the brake cylinder when it is being filled with hydraulic fluid is drilled into the material of the skein itself. Fittings 477 and 478 serve respectively to connect a flexible hydraulic line to passage 475 and to closed passage 476 when it is not in use. Details of the axle are not shown, inasmuch as it is broadly immaterial what sort of an axle the described parts are used on. Likewise the tire may be provided with a tube 479 if desired, in which case the connection between sections 464 and 467 of the wheel rim need not be air tight.

We claim:

1. In combination, a fork lift truck, a portable platform, means to interconnect said fork lift truck with said portable platform comprising lift fork tines on said fork lift truck, and co-acting connecting means on said tine and said portable platform respectively, said means comprising a plurality of aligned universally pivotal joints between said tines and said platform, at least one such universal joint including parts slidable in a direction transverse to said tines, whereby said portable platform may remain secured to said tines despite independent movement of said tines.

2. The device of claim 1 in further combination with tracks secured to parallel margins of said lift truck, carriages movable along said tracks, lift towers mounted upon said carriages for movement bodily along said track and slides reciprocable vertically on respective towers and carrying said tines.

3. The combination of a lift truck having independently movable lifting tines, a portable platform detachably universally connected with the tines, a sub-frame on said portable platform, means for moving said sub-frame longitudinally along said portable platform, means for preventing vertical movement of said sub-frame with respect to said portable platform, a cradle mounted upon said sub-frame for rotation about an axis above said cradle, and means on said sub-frame for rotating said cradle, said means mounting said cradle on said sub-frame for rotation comprising two end plates on said sub-frame between which said cradle is mounted, two gear sectors having a curvature concentric with the axis about which the cradle is to be rotated rigidly attached to the ends of said cradle, said gear sectors having an arcuate tongue and groove connection with said end plates, and gearing on said sub-frame for transmitting rotary motion to said gear sections.

4. In a lift tower in which substantial loads are imposed upon the tower in more than one plane, the sub-combination comprising a plurality of relatively movable lift tower members, said members being provided with guide channels extending parallel to the axis of relative movement between said tower members, said channels in adjacent tower members being opposed to form a substantially tubular structure, rollers within said channels having axial and radial engagement with the sides of each of the opposed channels to act as antifriction bearings for movement in the direction parallel to the channels, and to prevent relative movement between associated tower members in any other direction, axles for said rollers, two said rollers being mounted on each said axle, and a gear mounted on said axle between said rollers, the bottoms of said channels being provided with racks extending longitudinally along the centers of the bottoms of said channels, said racks and said gears being proportioned so that each gear is in constant mesh with the racks in the opposed channels without engagement between the racks and the rollers, whereby when relative movement takes place between said tower members, the rollers will move in the direction of said relative movement one-half of the distance moved by the tower member.

References Cited in the file of this patent

UNITED STATES PATENTS

| | | |
|---|---|---|
| 2,279,832 | LeTourneau | Apr. 14, 1942 |
| 2,389,424 | DeCardy | Nov. 20, 1945 |
| 2,479,036 | Campbell | Aug. 16, 1949 |
| 2,479,623 | Johnson | Aug. 23, 1949 |
| 2,595,120 | Barnes | Apr. 29, 1952 |
| 2,620,930 | Mullgardt | Dec. 9, 1952 |
| 2,621,812 | Lull | Dec. 16, 1952 |
| 2,651,348 | Monette | Sept. 8, 1953 |
| 2,720,993 | Lull | Oct. 18, 1955 |
| 2,752,056 | Hull | June 26, 1956 |
| 2,773,614 | Edwards et al. | Dec. 11, 1956 |
| 2,788,223 | Mersheimer et al. | Apr. 9, 1957 |
| 2,897,985 | Carlson et al. | Aug. 4, 1959 |